United States Patent [19]

Kyfes

[11] Patent Number: 5,007,666
[45] Date of Patent: Apr. 16, 1991

[54] TONGUE AND GROOVE SNAP-FIT PIPE COUPLING

[75] Inventor: Vincent Kyfes, Mesa, Ariz.

[73] Assignees: C & L Development Inc.; Chill Tech, Inc., both of Mesa, Ariz.; part interest to each

[21] Appl. No.: 467,190

[22] Filed: Jan. 19, 1990

[51] Int. Cl.⁵ ............................................. F16L 47/06
[52] U.S. Cl. ....................................... 285/373; 285/15; 285/156; 285/182; 285/373; 285/419; 285/423; 285/921; 138/99; 138/162; 138/166
[58] Field of Search ................... 285/15, 150, 373, 419, 285/423, 920, 921; 138/99, 162, 166

[56] References Cited

U.S. PATENT DOCUMENTS

| | | | |
|---|---|---|---|
| 1,866,672 | 7/1932 | Salmon | 285/182 X |
| 3,229,998 | 1/1966 | Pennington | 285/419 |
| 3,771,820 | 11/1973 | Hoss, Sr. et al. | 285/373 |
| 3,865,662 | 12/1975 | Segal | 156/94 |
| 4,109,944 | 8/1978 | Curtin | 285/373 |
| 4,111,234 | 9/1978 | Wells | 138/99 |
| 4,260,181 | 4/1981 | Curtin | 285/15 |
| 4,576,846 | 3/1986 | Noel | 138/162 X |

Primary Examiner—Andrew V. Kundrat
Assistant Examiner—Tim Aberle
Attorney, Agent, or Firm—Warren F. B. Lindsley

[57] ABSTRACT

A pipe fitting for encompassing a conduit comprising a pair of interlocking segments with each segment comprising an arcuate configuration having at least two longitudinal edges with one edge of each segment comprising a tongue split longitudinally thereof in a direction substantially perpendicular to its length. The other of the edges comprising a groove conforming to and receiving the tongue formed on the juxtapositioned edge of the other of the segments. The tongue when forced into the opening in the groove in the other of the segments causing its two parts to engage each other along the length of the slot and when in the groove to again separate causing the tongue to interlock with the periphery of the groove thereby interlocking the segments of the pipe fitting together.

3 Claims, 1 Drawing Sheet

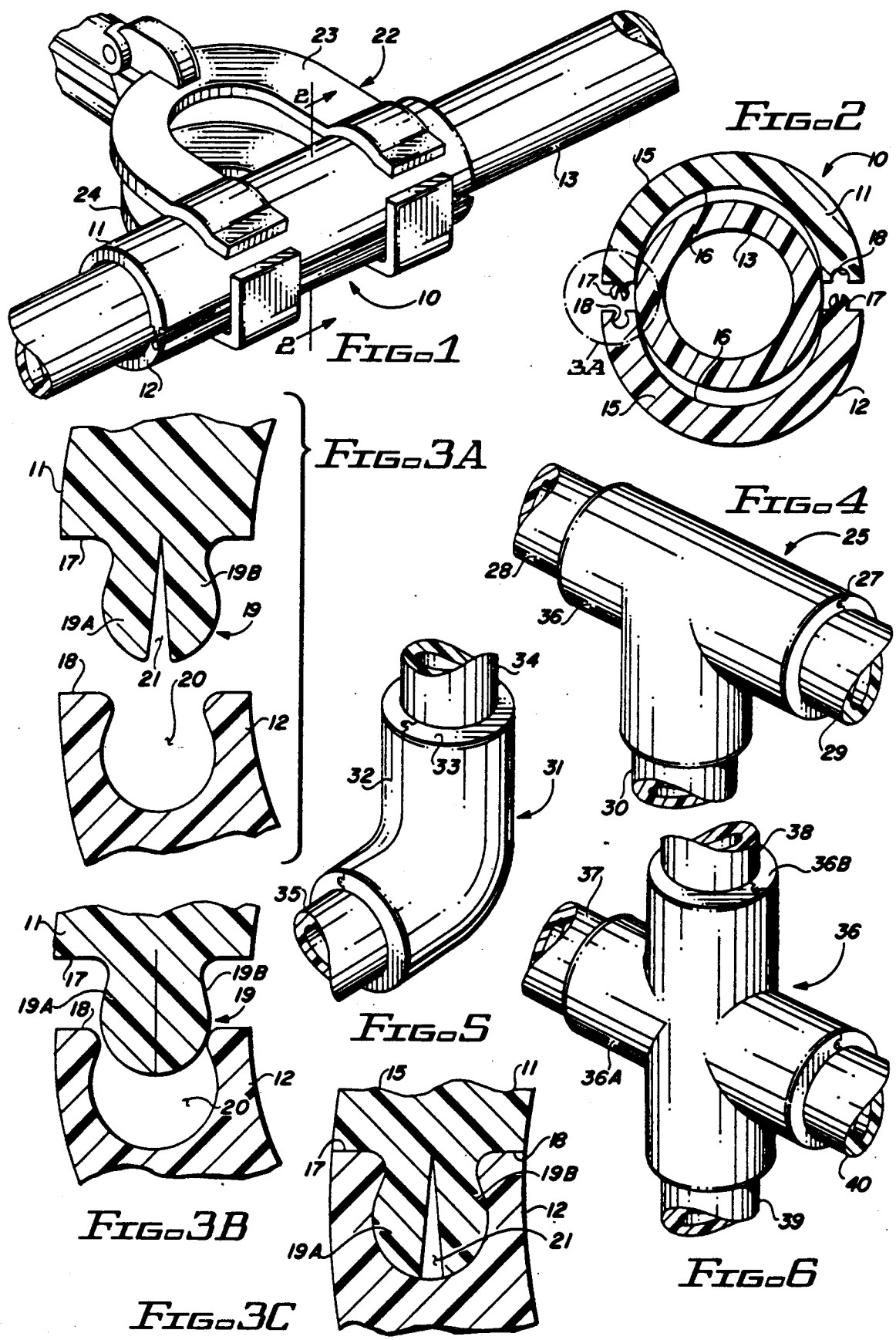

TONGUE AND GROOVE SNAP-FIT PIPE COUPLING

BACKGROUND OF THE INVENTION

This invention relates to a method for rapidly joining and/or repairing thermoplastic pipes and more particularly to a novel pipe coupling which is mechanically as well as adhesively bonded to the pipe or tubular member for connection and/or repair purposes.

DESCRIPTION OF THE PRIOR ART

Although the prior art is directed to split sleeve pipe couplings, none have accomplished such a repair function in the manner and with the type of pipe fitting disclosed and claimed herein.

Prior pipe fitting for threadless tubing have for the most part included bulky housings composed of several parts requiring excessive space and laborious installation.

U.S. Pat. No. 3,229,998 discloses a split sleeve pipe coupling employing an integral fastening means.

U.S. Pat. No. 3,771,820 discloses an adhesively bonded split sleeve coupling for pipes and tubular members wherein overlapping portions of adjacent sleeve elements include flat confronting surfaces to permit sliding in a linear relationship to each other as they are moved radially relative to the members being joined.

U.S. Pat. No. 3,865,662 discloses a method for sealing shell-like thermoplastic objects by supporting the area of the object to be treated, applying a preheated reinforced thermoplastic charge and exerting pressure against the support to seal the desired area.

U.S. Pat. No. 4,109,944 discloses a pipe coupling comprising a pair of semi-cylindrical pipe sections adapted to fit around and engage the emplaced pipes with each section including two longitudinally spaced lugs formed integrally with the wall of the pipe sections for fastening purposes.

U.S. Pat. No. 4,111,234 discloses a permanent repair clamp for pipes which is to be installed over a single or double ended pipe bell. The device comprises separately formed opposing clamp sections of semi-cylindrical formulation with leak proof interface gasketing between the clamp sections and between such sections and the pipe on which the device is installed.

U.S. Pat. No. 4,260,181 discloses a pipe coupling comprising a pair of substantially semi-cylindrical pipe sections having longitudinal edges formed so as to mate with one another to hold the sections together. Each of the pipe sections include a portion of reduced wall thickness adjacent a first longitudinal edge which extends radially inwardly from the outer circumference of the section to a portion of reduced wall thickness adjacent a second longitudinal edge thereof whereby the first and second pipe sections can be mated with their longitudinal edges opposed around the pipe.

SUMMARY OF THE INVENTION

The present invention is directed to further improvements in pipe couplings useful for repairing damaged portions of unthreaded plastic pipe systems. More particularly, the present invention is directed to couplings for repairing pipe breaks wherein two substantially semi-cylindrical pipe sections have longitudinal edges formed to mate with each other wherein the engaging edges contract and then expand to interlock with each other in addition to the use of an adhesive on the engaging edges for forming a solid liquid proof joint.

It is, therefore, one object of this invention to provide a longitudinally split or divided sleeve type pipe fitting for threadless pipes or tubes having a smooth, substantially continuous bore wherein adjacent interlocking sections or segments are joined by a contracting and expanding sealable joint.

Another object of this invention is to provide a new and improved pipe coupling which provides a reliable connection without requiring bending of pipes that are fixed in position in the ground.

A further object of this invention is to provide an improved pipe coupling having mating longitudinal edges which hold the pipe sections together in a novel manner while the cement applied thereto is drying to form a water-tight seal.

A still further object of this invention is to provide a pipe coupling which is compact and may be assembled in limited space with the minimum use of tools.

Further objects and advantages of this invention will become apparent as the following description proceeds and the features of novelty which characterize this invention will be pointed out with particularity in the claims annexed to and forming a part of this specification.

BRIEF DESCRIPTION OF THE DRAWING

The present invention may be more readily described by reference to the accompanying drawing in which:

FIG. 1 is a perspective view of a novel pipe coupling held together during sealing to a pipe by a pipe clamp and embodying the invention;

FIG. 2 is a cross sectional view of FIG. 1 taken along the line 2—2;

FIG. 3A is an enlarged view of the circle area of FIG. 2;

FIG. 3B is a view of the structure shown in FIG. 3A with the longitudinal engaging edge of one of the pipe sections contracting to enter into the associated slot in the longitudinal edge of the other pipe section;

FIG. 3C is a view showing the engaging edges of the pipe section shown in FIGS. 3A and 3B in sealing engagement with each other;

FIG. 4 is a modification of the pipe fitting shown FIGS. 1–3C illustrating novel pipe sections as applied to a T-shaped pipe coupling;

FIG. 5 is a further modification of the pipe fitting shown in FIGS. 1–4 illustrating novel pipe sections as applied to an elbow shaped pipe fitting or coupling; and FIG. 6 is a still further modification of the coupling shown in FIGS. 1–5 illustrating the invention as applied to a 4-way coupling.

DESCRIPTION OF THE PREFERRED EMBODIMENT

Referring more particularly to the drawing by characters of reference, FIGS. 1–3C disclose a coupling 10 comprising a pair of similar or identical semi-cylindrical pipe sections 11 and 12 which are configured so as to automatically interlock relative to one another when they are squeezed around an emplaced pipe 13.

The semi-cylindrical pipe sections 11 and 12 are identical to one another and each is formed by a wall having inner and outer circumferential surfaces 15 and 16 and first and second longitudinal edges 17 and 18.

As noted more clearly from FIGS. 3A–3C, edge 17 comprises a necked down arcuate nipple or tongue like split flange 19 that extends longitudinally along one edge 17 of the semicylindrical pipe section 15 with the opposite edge 18 of the semi-cylindrical pipe section 15 being provided with a cooperating groove 20 for receiving a flange 19 on the associated pipe section 16. Flange 19 is provided with a slot or split 21 which permits flange 19 to separate one half 19A from the other half 19B as shown more clearly in FIG. 3A. This split is triangular in shape tapering inwardly from the knob or top of the tongue shaped configuration.

Thus, when flange 19 of pipe section 11 is forced into groove 20 in edge 19 of pipe section 12 parts 9A and 9B of flange 19 are forced together as shown in FIG. 3B in order to enter groove 20. When flange 19 is fully in place in slot 20 in pipe section 12 the parts 19A and 19B separate under the memory of the plastic material to again provide split 21. The assuming of the natural position of parts 19A and 19B of flange 19 causes an interlocking of flange 19 with groove 20 which is maintained while an adhesive placed in groove 19 and/or on the outer circumference of nipple, tongue or flange 19 before assembly of the pipe section 11 and 12 is set and/or cured.

Although the pipe sections may be forced together by hand, the clamp 22 shown in FIG. 1 is provided for that purpose. This clamp or VISE GRIP pliers comprises a pair of arms 23 and 24 the ends of which partially surround pipe coupling 10 and force together the interlocking edges 17 and 18 with similar edges 18 and 17 of an identical pipe section as shown in FIGS. 1 and 2.

As shown in FIG. 4 the novel pipe sections shown in FIGS. 1-3C may be applied to a T-shaped pipe coupling 25. This coupling may comprise two identical pipe sections 26 and 27 which are each provided with edges similar to edges 17 and 18 of FIGS. 1 and 2 and nipple, tongue or flanges 19 which cooperate with corresponding grooves 20 in a cooperating identical but reversibly positioned pipe section. Thus, this type of pipe section may be used to interconnect the ends of juxtapositioned pipe sections 28, 29 and 30 as shown.

FIG. 5 illustrates the invention as applied to an elbow pipe coupling 31 comprising two identical but reversed parts 32 and 33 having the same flange and groove connectors shown in FIGS. 1-4. Coupling 31 is used to interconnect juxtapositioned pipe sections 34 and 35.

FIG. 6 illustrates the invention as applied to a 4-way coupling 36 having two identical interconnecting tongue and groove or flange and groove connections as discussed above for FIGS. 1-5. Coupling 36 is used to interconnect the ends of juxtapositioned pipes 37, 38, 39 and 40.

From the foregoing, it should now be appreciated that improved pipe couplings have been disclosed herein for use in plastic pipe plumbing systems for facilitating repair and installation.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A longitudinally divided plastic pipe fitting for encompassing conduits comprising:
   a pair of substantially similar interlocking plastic segments,
   each of said segments comprising a generally arcuate shaped body having at least two longitudinal edges,
   one of said edges comprising a tongue split longitudinally thereof in a direction substantially perpendicular to its length into two interconnected parts separated by a triangular slot
   the other of said edges comprises a groove conforming to and receiving the tongue formed on the juxtapositioned edge of the other of said segments,
   said tongue when forced into the opening in said groove in the other of said segments causing its two parts to engage each other along the length of its slot and when fully in the groove opening under memory of the plastic of said parts to form again said triangular slot causing the tongue to interlock with the periphery of said groove thereby interlocking the segments together.

2. The pipe fitting set forth in claim 1 wherein:
   said segments defining a cross section that comprises a semi-circular configuration.

3. The pipe fitting set forth in claim 1 wherein:
   said segments when interlocked together form a cylindrical configuration.

* * * * *

UNITED STATES PATENT OFFICE
CERTIFICATE OF CORRECTION

Patent No. 5,007,666            Dated April 16, 1991

Inventor(s) Vincent Kyfes

It is certified that error appears in the above-identified patent and that said Letters Patent is hereby corrected as shown below:

Column 4

Claim 1, line 11, after "slot" insert ---, said slot being widest along the outside surface of said tongue, and further narrowing as it progresses to the interior of said tongue,---.

Signed and Sealed this

Eighteenth Day of August, 1992

Attest:

DOUGLAS B. COMER

*Attesting Officer*      *Acting Commissioner of Patents and Trademarks*